Dec. 13, 1955   M. E. BLECK ET AL   2,726,831
AIRCRAFT SEAT
Filed Jan. 12, 1953   2 Sheets-Sheet 2
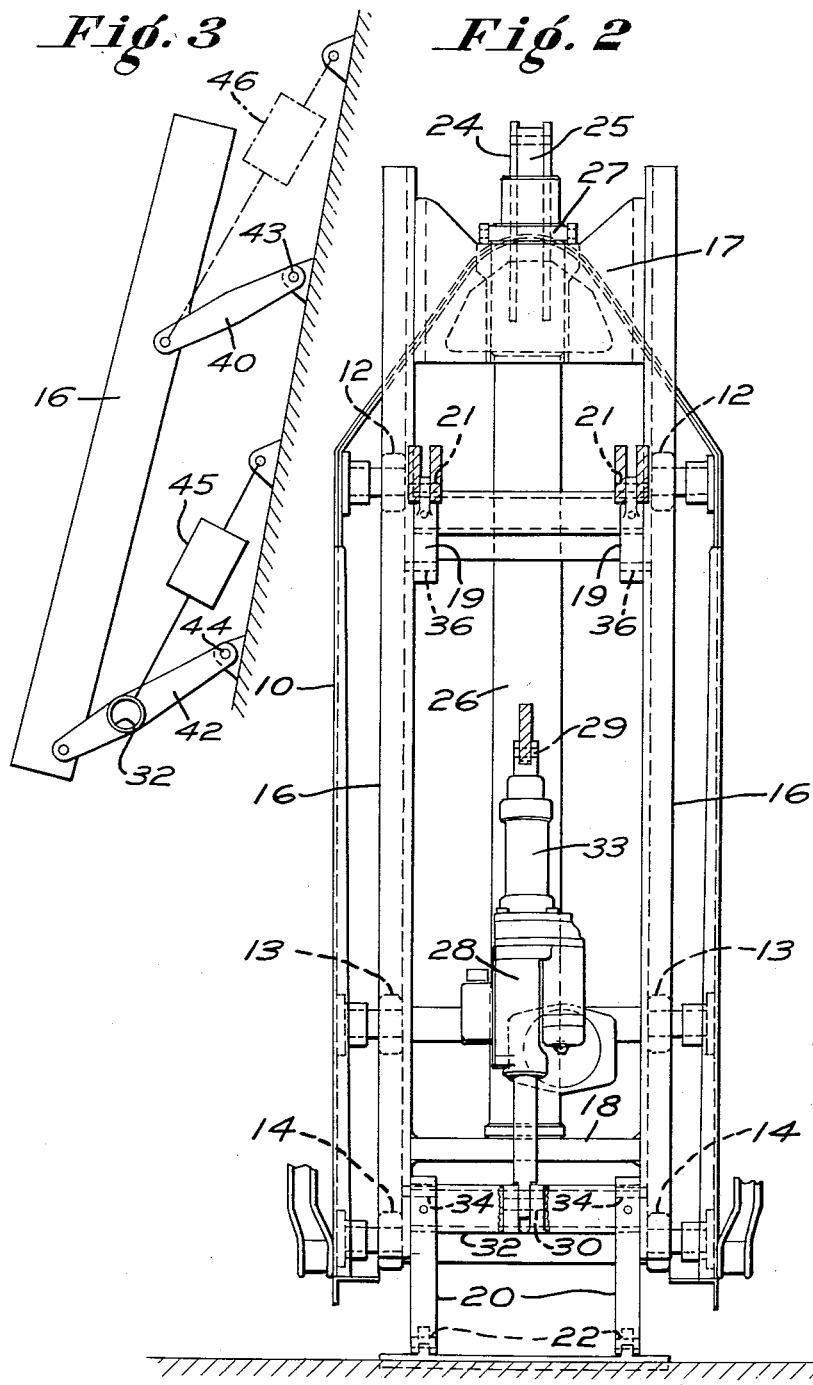
INVENTORS
MAX E. BLECK AND
EDWARD H. REPLOGLE
BY
Beau, Brooks, Buckley & Beau,
ATTORNEYS.

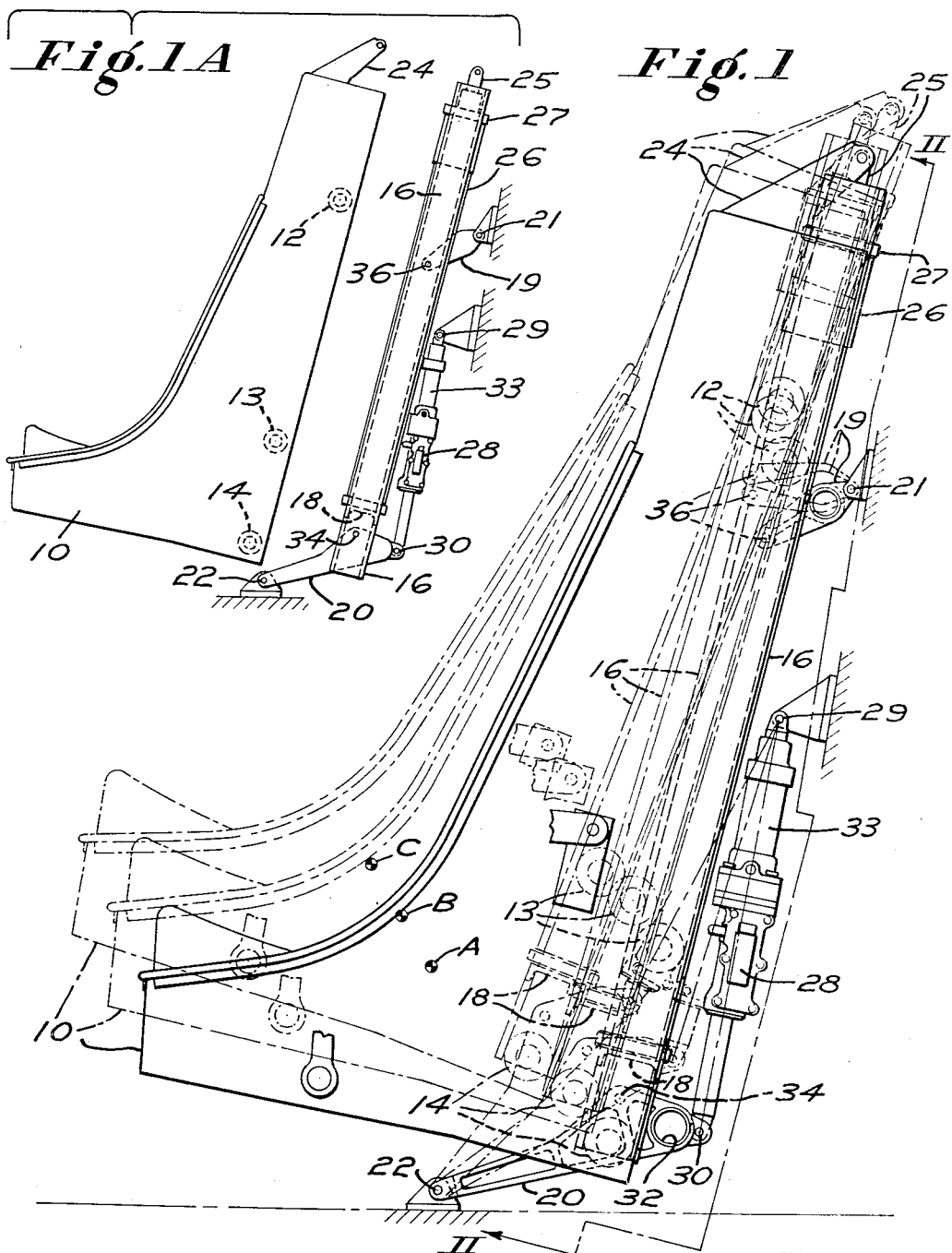

United States Patent Office 2,726,831
Patented Dec. 13, 1955

2,726,831

AIRCRAFT SEAT

Max E. Bleck, Kenmore, and Edward H. Replogle, Snyder, N. Y., assignors to Stanley Aviation Corporation, Buffalo, N. Y.

Application January 12, 1953, Serial No. 330,658

9 Claims. (Cl. 244—122)

This invention relates to aircraft crewman seats, and more particularly to improvements in such seats which are adapted to be jettisoned from the aircraft in case of emergency, as in the case of U. S. Patent No. 2,459,948 for example, and which are also adjustable upwardly and forwardly or downwardly and rearwardly to suit variously sized crewmen.

To meet U. S. military aircraft standardized requirements for accommodation of variously sized aircraft personnel, it has been determined that a pilot's seat should be adjustable in a vertically inclined and substantially straight line path having about three inches of horizontal movement component for each five inches of vertical movement component.

Prior ejection seat designs have usually employed separate seat and ejection carriage units; the ejection carriage unit being movable along a fixed slideway or the like for emergency ejection purposes while the seat is movable both vertically and in fore-and-aft directions relative to the ejection carriage to permit adjustments for differently sized crewmen. However, such mechanisms of the prior art involve the use of ejection carriage structures which are of necessity quite heavy, in order to be of sufficient strength for both normal support of the seat and to withstand the high acceleration loadings thereon when the seat and occupant are ejected from the airplane.

A forward component of seat adjustment is necessary to compensate for the different leg lengths of various crewmen while at the same time the eye levels must be kept substantially constant and at approximately the same fore-and-aft positions relative to the aircraft instruments. Thus the prerequisites for a structurally simplified and reduced weight ejection seat design may be satisfactorily met through use of an ejection track which is both fore-and-aft and vertically adjustable at both its upper and bottom ends upon which the seat is mounted to be normally fixed thereon but jettisonable therefrom for emergency ejection purposes. Furthermore, it will be appreciated that the ejection track unit must be "aimed" at a fuselage opening of minimum size which will accommodate passage of the jettisoning body and seat and accessories, regardless of the anthropometric adjustment position of the seat.

A primary object of the present invention is to provide an improved aircraft crewman seat embodying the features and advantages aforesaid.

Another object of the invention is to provide an improved aircraft crewman seat of the ejectable type which is of improved strength and adapted for satisfactory high speed ejection operation, while being at the same time of decreased weight compared to anthropometrically adjustable ejection seat arrangements of the prior art.

Another object of the invention is to provide an improved aircraft crewman seat of the ejectable type which incorporates mechanism permitting up and forward and down and back diagonal adjustments of the seat without the use of an intermediate structure between the seat and the ejection track device, thereby attaining substantial weight reduction and mechanical simplification.

Another object of the invention is to provide an improved aircraft seat embodying a movable ejection rail structure upon which is mounted a jettisonable seat; the aforesaid devices being adjustable as a unit to permit shifting of the seat occupant's "hip center" position in the ideal straight-line diagonal path, to suit differently sized and shaped personnel.

Another object of the invention is to provide an improved aircraft crewman seat of the ejectable type, embodying a novelly suspended ejection rail structure upon which is mounted a substantially vertically jettisonable seat.

Another object of the invention is to provide a seat arrangement as aforesaid wherein the seat is at all times readily ejectable from the aircraft along the rail structure without requiring preliminary return or "bottoming" of the seat to any prescribed "base" position on the rail structure.

Other objects and advantages of the invention will appear from the specification hereinafter.

In the drawings:

Fig. 1 is a side elevation of an upward ejection seat of the invention wherein the ejection rail structure is swingably suspended adjacent its upper and lower ends to the aircraft frame; showing the seat in three different positions for pilot accommodation;

Fig. 1–A is an "exploded" side elevational view of the device of Fig. 1;

Fig. 2 is a rear elevation of the seat construction of Fig. 1 and

Fig. 3 is a diagrammatic side elevational view of a modified form of mounting of the seat support rail structure.

As illustrated in Fig. 1, a seat arrangement of the invention may be constructed to comprise a seat bucket 10 mounting upper guide rollers 12 and lower load carrying rollers 13, 14, respectively, which are disposed to run in way means comprising channel-sectioned tracks or rails 16—16 at opposite sides of the seat. The rails 16—16 are interconnected by upper and lower cross bars 17—18 and the unit is suspended as by means of a pair of upper links 19—19 and bottom crank arms or links 20—20 pivoted to fixed structural portions of the aircraft as indicated at 21—22 respectively. Thus, the rail unit is suspended by the links 19—19 and the crank arms 20—20 for swinging movements of the lower end of the unit about the pivot mounts 22—22 in an arc as shown which may be designated a "first quadrant arc," while the upper mid-portion of the rail frame will swing about the pivot mounts 21—21 in an arc as shown which may be designated a "third quadrant arc"; as shown in broken lines in Fig. 1. In other words, the links and crank arms are oscillated in quadrants which are diametrically opposite each other.

To maintain the seat bucket 10 in the rail unit in normally mounted relation therein, we provide integrally with the seat back a suspension horn 24 which pivotally connects to one end of the thrust member 25 of any suitable seat catapult device; the casing portion 26 of the catapult being fixed to the rail frame cross head member 17 as indicated at 27. Thus the seat unit is at any time ejectable from the rail structure in a substantially vertical direction in response to operation of the catapult 26. Fig. 1–A is a simplified "exploded" view of the construction of Fig. 1 and clarifies the functional relationship of the seat and the rail unit and positional adjustment mechanisms.

Any suitable control means for regulation of the position of the rail-seat unit in the aircraft to suit various seat-occupants may be used. For example, a jack as indicated at 28 may be used, and may comprise an electric motor driven screw device pivotally connected at one end to the fixed structure as indicated at 29 and at its other end as indicated at 30 to a cross tube 32 interconnecting the free ends of the crank arms 20—20. A "bottoming" device as indicated at 33 may be conveniently mounted directly on the jack 28 as a continuation thereof, as will be explained hereinafter. The crank arms 20—20 are pivotally connected as indicated at 34—34 to their respective rails 16—16 while the links 19—19 are pivotally connected to the side rails 16—16 as indicated at 36—36; and thus it will be appreciated that operation of the jack 28 to either increase or decrease the effective length thereof will act to swing the lower end of the rail-seat unit about the centers of the mounts 22—22. This in turn will force the upper portions of the rail-seat unit to swing about the centers 21—21 of the pivoting links 19—19.

As appears from the drawing at Figs. 1–1A, the links 19 and the cranks 20 are so arranged that as the seat-rail unit moves between "bottomed" and "raised" positions the links 19 move about their pivot connections 21 to define "third quadrant" arcs, and the cranks 20 move about their pivot connections 22 to define "first quadrant" arcs. Furthermore, as seen in side view the links 19 and the cranks 20 are in substantially parallel relative dispositions, while the cranks 20 are of greater lengths than the links 19.

Thus, operation of the jack 28 in one direction acts to simultaneously raise the seat and to swing the lower end thereof forwardly; while reverse operation of the jack acts to lower the seat and to swing the lower end thereof rearwardly. Simultaneously, the upper end of the seat-rail unit swings upwardly or downwardly, with only slight consequent fore-and-aft displacements.

Hence, it will be appreciated that manual control of the jack through any suitable mechanism (not shown) will cause the seat to be positionally adjusted to suit differently sized crewmen for maximum comfort and operational efficiency. For example, when the seat is "bottomed" as in the solid line position thereof of Fig. 1, the crewman's body position reference point may be as designated at "A," while when the seat is moved to a mid-position the same reference point will shift as to "B," while when it is moved to its maximum upwardly and forwardly adjusted position the same reference point would be located as at "C," and the line of travel thereof will have been in a diagonal but substantially straight line. Such adjustments of the rail-seat unit operate to so synchronize the fore-and-aft and upward-downward swinging movements of the unit that crewmen of different body and leg lengths may be readily accommodated so as to be seated within convenient leg-reach of the aircraft rudder pedals or the like; while the elevational and fore-and-aft positions of the occupant's head are simultaneously adjusted to ideal positions.

Emergency jettisoning of the seat of Fig. 1 and its occupant will be effected upon actuation of the catapult device 26; it being understood of course that any suitable high acceleration thrust developing device may be employed for this purpose, such as for example the presently standard powder burning type catapult. In any case upon manual operation of the catapult control (not shown) the thrust rod 25 will act to project the seat and its occupant upwardly, as guided by the action of the rollers 12—14 in the rails 16—16 and through an appropriate opening in the top of the aircraft body. It is to be particularly noted that the pivotal suspension arrangement of the rail unit operates under all conditions to direct the catapulting movement of the seat toward the same ceiling position in the aircraft body irrespective of the angularly adjusted position of the seat relative to the aircraft body. Consequently, the jettison hatch through the aircraft body may be of minimum size. As shown at 33, a "bottoming" device such as a gas-operated piston-cylinder unit may be provided as an integral extension of the jack mechanism 28, to arrange for emergency "bottoming" of the seat-rail unit relative to the airframe structure before actuation of the catapult device, as may be required for example so as to insure that the ejected members clear the fixed structures of the aircraft. By mounting the cylinder 33 on top of the actuator 28, the units 28—33 do not interfere with each other in a selective operation thereof.

Fig. 3 illustrates diagrammatically in side elevation a modified form of mounting of the rail unit 16—16 on the fixed airframe structure. In this case the rails 16—16 are mounted by upper links 40 which are similar to links 19 of Fig. 1, and lower links 42 in lieu of the cranks 20 of Fig. 1. The links 40—42 are pivoted to the fixed airframe structure as indicated at 43—44, and are disposed in substantially parallel relation. However, as in the case of Fig. 1, the lower links are longer than the upper links so as to "throw" the lower end of the rail-seat unit through a longer radius arc when the positional adjustment control mechanism is operated. For this purpose, any suitable jack or the like as indicated at 45 (or at 46) may be used, and of course the seat bucket and catapult devices may be of any suitable types and mounted on the rails 16—16 as preferred.

We claim:

1. An ejection seat device adapted for mounting in an aircraft comprising track means, supporting and guide link means for mounting said track means in the aircraft in substantially upright attitude and guiding the upper portion of said track means to oscillate in one quadrant arc and guiding the lower portion of said track means to oscillate in the opposite quadrant arc, a passenger seat mounted upon said track means for jettisoning movement therealong, and means connected to said track means operable to cause said track means to oscillate upon said link means to adjust said seat to suit different personnel.

2. An aircraft seat construction adapted for mounting in an aircraft comprising, a seat support frame, a seat mounted upon said frame, supporting and guide link means for mounting said frame in the aircraft in substantially upright attitude and guiding the upper portion of said frame to oscillate in one quadrant arc and guiding the lower portion of said frame to oscillate in the opposite quadrant arc, and means connected to said frame operable to cause said frame to oscillate upon said link means to adjust said seat to suit different personnel.

3. An ejection seat device adapted for mounting in an aircraft comprising, track means, supporting and guide link means for mounting said track means in the aircraft in substantially upright attitude and guiding the upper and lower portions of said track means to oscillate in divergently directed arcuate paths, a passenger seat mounted upon said track means for jettisoning movement therealong, and means connected to said track means operable to cause said track means to oscillate upon said link means to adjust said seat to suit different personnel.

4. An ejection seat device adapted for mounting in an aircraft comprising, a support, support mounting and guiding link means for mounting said support in the aircraft in substantially upright attitude and guiding the upper and lower portions of said support to oscillate in divergently directed arcuate paths, a passenger seat mounted upon said support for jettisoning movement therealong, and means connected to said support operable to cause said support to oscillate upon said link means to adjust said seat to suit different personnel.

5. An ejection seat device adapted for mounting in an aircraft comprising track means, supporting and guide link means for mounting said track means in the aircraft in substantially upright attitude and guiding the upper portion of said track means to oscillate in one quadrant arc and guiding the lower portion of said track means to oscillate in the opposite quadrant arc, said arcs being of different sized radii whereby said upper and lower portions of said track means simultaneously oscillate along the diverging arcuate paths of said arcs, a passenger seat mounted upon said track means for jettisoning movement therealong, and means connected to said track means operable to cause said track means to oscillate upon said link means to adjust said seat to suit different personnel.

6. An aircraft seat construction adapted for mounting in an aircraft comprising, a seat support frame, a seat mounted upon said frame, supporting and guide link means and crank means for mounting said frame in the aircraft in substantially upright attitude, said link means being connected to and guiding the upper portion of said frame to oscillate in one quadrant arc and said crank means being connected to and guiding the lower portion of said frame to oscillate in the opposite quadrant arc, and means connected to said crank means operable to cause said frame to oscillate upon said link means and upon said crank means to adjust said seat to suit different personnel.

7. An ejection seat device adapted for mounting in an aircraft comprising, track means, substantially parallel upper and lower link means for mounting said track means in the aircraft and guiding the upper and lower portions respectively of said track means to oscillate in divergently directed arcuate paths, said upper and lower link means being of different lengths, a passenger seat mounted upon said track means for jettisoning movement therealong, and means connected to said track means and operable to cause said track means to oscillate upon said link means to adjust said seat to suit different personnel.

8. A passenger seat device adapted for mounting in an aircraft comprising, seat support and ejection way means, upper and lower link means for mounting said way means in the aircraft and to permit adjustment of the angular relation of said way means to the aircraft, a passenger seat mounted upon said way means for jettisoning movement therealong, and means connected to said way means operable to cause said way means to change attitude in the aircraft for the purpose of permitting adjustments of said seat to suit different personnel.

9. A passenger seat device adapted for mounting comprising, seat support and ejection way means, link means for mounting said way means in the aircraft and permitting adjustment of the angular relation of said way means to the aircraft, a passenger seat mounted upon said way means for jettisoning movement therealong, and means connected to said way means operable to cause said way means to change attitude in the aircraft for the purpose of permitting adjustments of said seat to suit different personnel.

References Cited in the file of this patent

UNITED STATES PATENTS

| | | |
|---|---|---|
| 2,227,717 | Jones | Jan. 7, 1941 |
| 2,357,825 | Hickman | Sept. 12, 1944 |
| 2,459,948 | Lobelle | Jan. 25, 1949 |
| 2,583,410 | Burnett | Jan. 22, 1952 |

FOREIGN PATENTS

| | | |
|---|---|---|
| 461,286 | Canada | Nov. 22, 1949 |
| 675,982 | Germany | May 23, 1939 |